(12) United States Patent
McGuinness et al.

(10) Patent No.: US 6,385,600 B1
(45) Date of Patent: May 7, 2002

(54) SYSTEM AND METHOD FOR SEARCHING ON A COMPUTER USING AN EVIDENCE SET

(75) Inventors: Deborah L. McGuinness, Summitt; Thomas W. Beattie, Metuchen; Lori Alperin Resnick, Highland Park, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/054,886

(22) Filed: Apr. 3, 1998

Related U.S. Application Data (60) Provisional application No. 60/041,823, filed on Apr. 3, 1997.

(51) Int. Cl.$^7$ ................................................. G06F 17/30
(52) U.S. Cl. ................................. 707/3; 707/4; 707/10; 706/60; 709/218
(58) Field of Search .............................. 705/45, 10, 54; 706/45, 60; 707/3, 103, 501, 4, 5, 104, 102, 10; 700/17, 83; 709/203, 218, 219, 227, 242; 345/356

(56) References Cited

U.S. PATENT DOCUMENTS

| 4,658,370 A | * | 4/1987 | Erman et al. .................. 706/60 |
| 4,847,784 A | * | 7/1989 | Clancey |
| 5,257,185 A | * | 10/1993 | Farley et al. ................ 707/100 |
| 5,297,253 A | * | 3/1994 | Meisel ........................ 395/357 |
| 5,418,943 A | | 5/1995 | Borgida et al. |
| 5,632,022 A | * | 5/1997 | Warren et al. ............... 345/350 |
| 5,644,686 A | * | 7/1997 | Hekmatpour ................ 706/45 |
| 5,659,724 A | | 8/1997 | Borgida et al. |
| 5,720,008 A | | 2/1998 | McGuinness et al. |
| 5,793,966 A | * | 8/1998 | Amstein et al. ............ 709/203 |
| 5,845,278 A | * | 12/1998 | Kirsch et al. ................... 707/3 |
| 6,064,971 A | * | 5/2000 | Hartnett ......................... 705/7 |
| 6,154,213 A | * | 11/2000 | Rennison et al. ........... 345/356 |

OTHER PUBLICATIONS

Verity, Incorporated. "Introduction to topic Guide V2.0," Sep. 23, 1996.*
Schneider et al. "Description logic Knowledge representation system specification from the KRSS group of the ARPA knowledge sharing effort", pp. 1–19, Nov. 1993.*
Ronald J. Brachman, et al., *Principles of Semantic Networks*, "Living With Classic: When and How to Use a KL–ONE–Like Language," Jun. 8, 1990, pp. 1–52.
Verity, Incorporated, "Introduction to Topics Guide V2.0," Sep. 23, 1996.
Ramesh S. Patil, et al., "Principles of Knowledge Representation and Reasoning—Proceedings of the Third International Conference," Oct. 25–29, 1992,pp. 777–788.
Peter F. Patel–Schneider, et al., "Description–Logic Knowledge Representation System Specification from the KRSS Group of the ARPA Knowledge Sharing Effort," Nov. 1, 1993,pp. 1–19.

* cited by examiner

*Primary Examiner*—Jean M. Corrielus
(74) *Attorney, Agent, or Firm*—Kenyon & Kenyon (57) ABSTRACT

A system and method for searching on a computer. The method involves generating a knowledge base. The knowledge base includes information. The method further involves specifying an evidence set to include a proper subset of the information. The method also entails deriving the evidence set from the knowledge base.

29 Claims, 4 Drawing Sheets

```
$Control:1        <Accrue>
technology        <Accrue>
*applications-services/content <Accrue>
*physical-network-and-access <Accure>
*platform-services <Accrue>
*technologies-tools-and-languages <Accrue>
*access-devices <Accrue>
*internet-television <Accrue>
*network-computers <Accrue>
*smartphone <Accrue>
**0.50"javaphone"
**pda <Accrue>
**0.80"personal digital assistant"
**0.50"pocket device"
**0.80"palm pilot"
**0.80"pda"
$$
```

SYSTEM AND METHOD FOR SEARCHING ON A COMPUTER USING AN EVIDENCE SET

CROSS-REFERENCE TO RELATED PATENT APPLICATIONS

This patent application claims the benefit of U.S. Provisional Application No. 60/041,823 entitled Knowledge Augmented Intranet Search, filed on Apr. 3, 1997, and which is incorporated herein by reference.

BACKGROUND OF THE INVENTION

The present invention is directed to a method and system for searching on a computer. More particularly, the present invention is directed to a system and method for deriving an evidence set from a knowledge base.

The field of search engines is known. Known search engines include those developed by Verity, Inc., AltaVista, and Lycos. By implementing a search engine, a user can express with precision a focussed area of interest in order to retrieve needed information. Typically, a search engine retrieves documents satisfying the exact terms in a search query. For example, if the search query includes the term "PDA," the search will not retrieve occurrences of "personal digital assistant," "pocket device," or other related terms. This produces under-inclusive results, meaning that documents containing relevant information are not retrieved. Often, however, it is difficult for a user to formulate a query capable of producing appropriately-inclusive results without existing knowledge of a subject area. This difficulty is especially prevalent when a lay user searches in subject areas containing technical terminology or jargon, which is unfamiliar to the lay user. For instance, when searching in the subject area of medical terminology, the lay user is more likely to employ everyday names for terms rather than the technical terms used by medical professionals. Even medical professionals may have difficulty in correctly spelling or recalling a proper medical term. Under-inclusive results also occur when relatively inexperienced users attempt to use search engines. For example, inexperienced users may fail to appreciate that certain search engines are case sensitive or require specific syntax.

Three approaches have been adopted to address under-inclusive results. The first approach employs manual query expansion. As noted above, if a search query is "PDA," the search will not retrieve occurrences of "personal digital assistant," "pocket device," or other related terms. Users familiar with these related terms may manually expand the query by substituting "PDA" in the search query with "'PDA'OR 'personal digital assistant' OR 'pocket device'". This query uses the logical OR operator and would retrieve those documents containing at least one of these terms. Manual query expansion, however, requires user knowledge of related terms. In addition, manual query expansion requires excessive user input. For instance, if a user manually expands the same query term and wished to repeatedly conduct the search, the user must reenter the same related terms each time the query is submitted. Finally, users must have working knowledge of the search engine syntax and the controlled vocabulary of the subject matter that is being searched.

The second approach to address under-inclusive results employs meta tagging. To implement meta tagging, the author of a document inserts metadata, also known as metainformation, into the contents of document itself or otherwise associates it with the document. Metadata is data that describes other data. For example, an author of a web page on the Internet's World Wide Web may insert meta tags into the source code of the web page. Typically, the meta tag is invisible to those viewing the web page with a traditional browser, such as Netscape Navigator, but is present in the source code and visible to search engines. Meta tags are usually words and phrases, which are related to the content of the web page, but do not exist in the text of the web page visible to the user. For example, when a search engine searches for "PDA" on the World Wide Web, the search engine retrieves documents containing "PDA," if "PDA" is either in the meta tag or the contents of the document. One disadvantage to meta tagging, however, is the investment required by authors to insert meta tags in each document. Moreover, once a document is created, it is time-consuming to modify the meta tags; each document must be reopened to edit the meta tags. Also, since meta tag information is inserted into each document there is an increased likelihood of a data entry error in the spelling or format of the meta tag information. In addition, the meta tag vocabulary might change, thus requiring a modification to all documents containing the meta tag information. Finally, meta tagging requires knowledge of the content of the web page. In many instances the author of a web page is a web page developer, who is developing the web page for others that are familiar with the content. Thus, meta tagging often requires coordination between a web page developer and those familiar with the content of the web page.

The third approach to address under-inclusive results employs evidence sets. An evidence set contains evidence, which constitute phrases or terms. The evidence is organized into topics. This knowledge is organized, typically in a hierarchical structure or taxonomy, and made available as a shared resource to users. An evidence set is employed by an application, such as a search engine, by incorporating knowledge about topics and associated phrases. One company, Sageware, Inc., has developed a number of KnowledgeSets, which are functionally similar to evidence sets, for specific subject areas. See SAGEWARE, INC., *Our Products: Sageware KnowledgeSets* (accessed on Mar. 21, 1998; copyright 1997) <http://www.sageware.com/products.html>. One use of evidence sets is for query expansion. In contrast to manual query expansion, query expansion with evidence sets does not require a manual substitution of related terms for each query. Rather, the search engine may automatically access the contents of the evidence set to automatically expand the search query.

Known methods for creating evidence sets require extensive user input. Other methods for learning evidence sets exist, however, it is known that evidence sets generated with learning algorithms on training data typically produce inferior quality evidence sets. In addition, known methods for creating evidence sets often produce evidence sets that are difficult to modify. Typically, methods for creating evidence sets include the use of either a standard text editor or a graphical user interface (GUI). An evidence set may be created with a text editor by inputting text and symbols in accordance with a known evidence set format. As evidence sets generally require a specific syntax, text editor creation has the disadvantage that minor inadvertent input errors may create an improperly formatted or non-working evidence set. For instance, a misplaced symbol or term may inadvertently change the relationship between evidences or topics in an evidence set. Because the syntax of evidence sets is often cumbersome, a user cannot readily apprehend when mistakes have occurred. Moreover, once an evidence set has been created with a text editor, it is relatively difficult to modify its structure. A text-edited modification requires reentry of evidences in the evidence set to comport with the newly-modified structure. Also, creating an evidence set with a text editor requires a user with working knowledge of the syntax of the evidence set. In addition, a user may create an inconsistent evidence set. For instance, a user may create a text-edited evidence set with multiple occurrences of the same topic. Moreover, using a text editor to create an evidence set, each topic may have a different set of evidences. This could create an internal inconsistency in the evidence set and result in an evidence set that is non-functioning or, at the very least, capable of producing inconsistent results. Finally, when making changes to a text-edited evidence set, a regression test must often be performed to fully understand the impact of changes to the evidence set.

A second known method for creating evidence sets employs GUIs. Such a method, developed by Verity, Inc., is topicEditor. VERITY, INC., *Introduction to Topics Guide V2.0* (copyrighted Sep. 23, 1996; visited Mar. 21, 1998) <http://www.verity.com/support/s97dk/topic20/topcover.htm> discloses the use of topicEditor. In topicEditor users create topics and evidences in a hierarchical GUI environment, which allows users to expand and collapse topics, copy or move topics using drag and drop, and re-use topics by selecting them from a drop-down list. Once a topic is created in topicEditor, a user may generate topic sets, which are functionally similar to evidence sets. These topic sets may be stored in a knowledge base. Typically, these types of knowledge bases only include information that is represented in the GUI environment. For instance, a GUI-created knowledge base typically contains only information that relates to the hierarchical structure of the topics and evidences. Typically, for any given GUI-created knowledge base there exists only one corresponding evidence set. Finally, modification of a GUI-created knowledge base requires excessive manipulation of the GUI environment.

SUMMARY OF THE INVENTION

The present invention is directed to a method for searching on a computer. In accordance with the method of the present invention, a knowledge base is generated, which includes information, an evidence set is specified to include a proper subset of the information, and an evidence set is derived from the knowledge base.

In accordance with another aspect of the invention, the knowledge base further includes a first entity and a second entity with a description logic relationship existing between the first entity and the second entity.

In accordance with one other aspect of the invention, the knowledge base further includes a first class expression and a second class expression with a rule-based relationship existing between the first class expression and the second class expression.

In accordance with yet another aspect of the invention, the knowledge base includes a role, which defines authorship.

In accordance with another aspect of the invention, the knowledge base includes a class, which includes metainformation.

In accordance with another aspect of the invention, the knowledge base includes a class, which defines visibility.

In accordance with another aspect of the invention, the knowledge base includes necessary and sufficient conditions.

DETAILED DESCRIPTION

In accordance with the system and method of the present invention, a evidence set is derived from a knowledge base.

Figure 1:
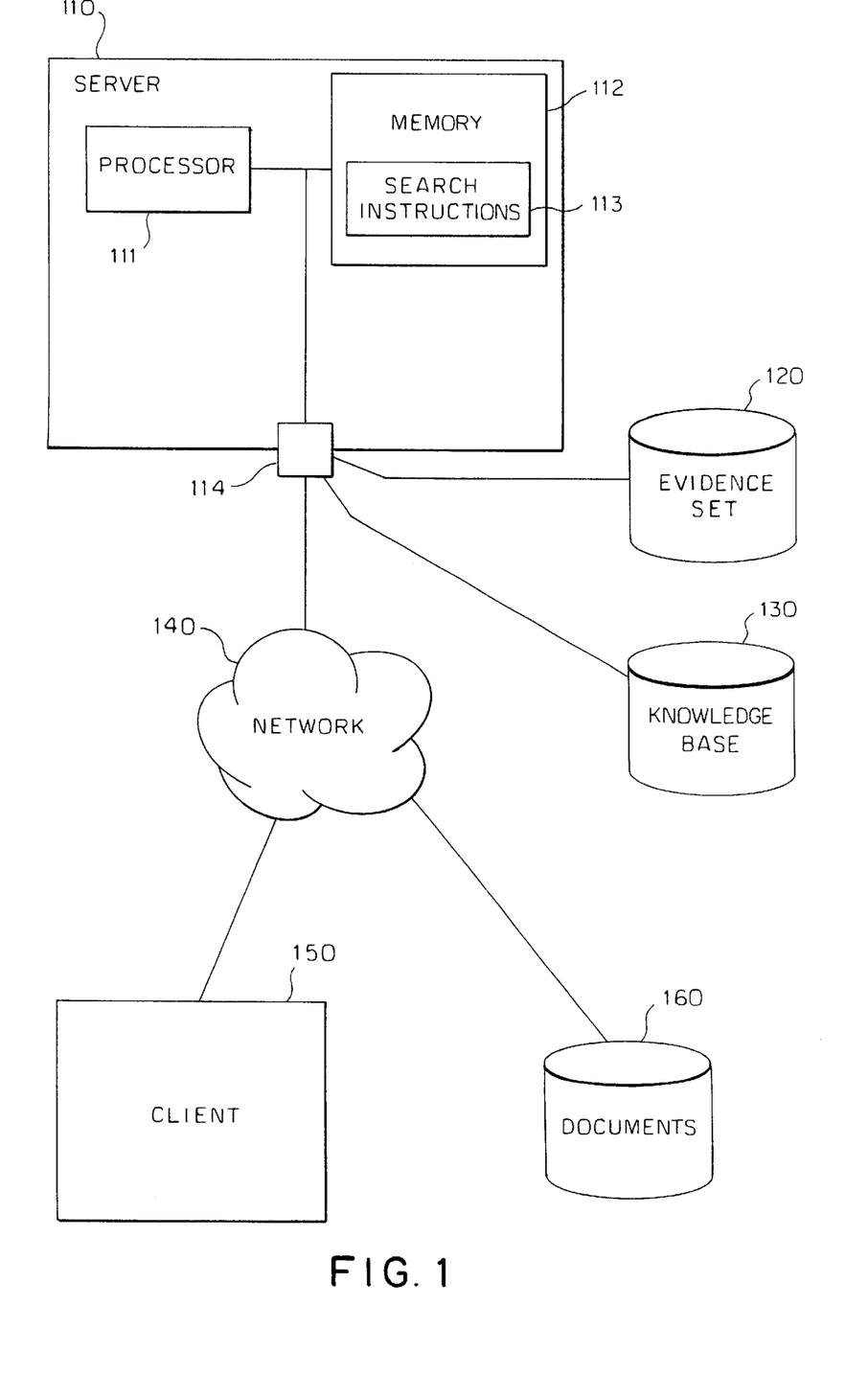
FIG. 1 illustrates in schematic form a network in which the method of the present invention may be implemented.

FIG. 1 shows an environment in which the present invention might be employed. For example, server 110 is a computer. A computer is a functional unit that can perform substantial computation, including numerous operations without human intervention. Server 110 includes a processor 111, memory 112, and port 114. Processor 111 can be any system or mechanism that accepts a program as input, prepares it for execution, and executes the process so defined to produce results. A program is a sequence of instructions suitable for processing by a computer. Memory 112 includes, but is not limited to, any device in which information can be stored. Port 114 is a place of access to a device or network where energy may be supplied or withdrawn or where the device or network variables may be observed or measured. The processor 111 and memory 112 are coupled to each other, and both the processor 111 and memory 112 are coupled to the port 114. Coupled includes joined, associated, linked, bonded, attached, in communication, connected, and affiliated, and is not limited to relationships requiring physical contact or proximity. A portion of the memory 112 includes search instructions 113. The search instructions 113 include instructions to perform the present invention. For the purposes of this discussion, search instructions 113 are not limited to those instructions that perform or execute a search engine. Search instructions 113 are adapted to be executed by the processor. Typically, search instructions 113 are in the form of a program. Search instructions 113 may be stored on a medium. Examples of medium that store instructions include a hard disk, a floppy diskette, a Compact Disc Read Only Memory (CD-ROM), a flash memory, an electrically erasable programmable read-only memory (EEPROM), a tape, and any other device that can store information. As used herein, the phrase "adapted to be executed by a processor" is meant to encompass instructions stored in a compressed and/or encrypted format, as well as instructions that require compilation or installation before execution by a processor.

Server 110 is coupled to a network 140. Network 140 is a plurality of points interconnected by communication channels. Examples of network 140 include local area networks (LAN), wide area networks (WAN), and interconnected networks such as the World Wide Web. Server 110 is coupled to both an evidence set 120 and knowledge base 130 via the port 114. It will be understood by those skilled in the art, that this embodiment could also be modified to couple the evidence set 120, the knowledge base 130, or both, to the network. Moreover, the evidence set 120, the knowledge base 130, or both, could also be stored on the server or on a client 150. In Internet applications, a single evidence set 120 is accessed by a plurality of clients (not shown). Accordingly, in many instances it is desirable to couple the evidence set 120 directly to the server 110 as indicated in FIG. 1. As will be discussed below, the evidence set 120 is derived from the knowledge base 130, and thus, it is often desirable to couple the knowledge base directly to the to the server 110 via the port 114.

Evidence set 120 is a grouping of evidence and topics. Evidence is a phrase. Typically, evidence is the phrase that is searched for. A topic is a grouping of evidence that is related by subject area. Evidences and topics can be created as independent units or as units with relationships to other evidences or topics in a hierarchical structure. Evidence set 120 may be stored as an individual file.

Figure 2:
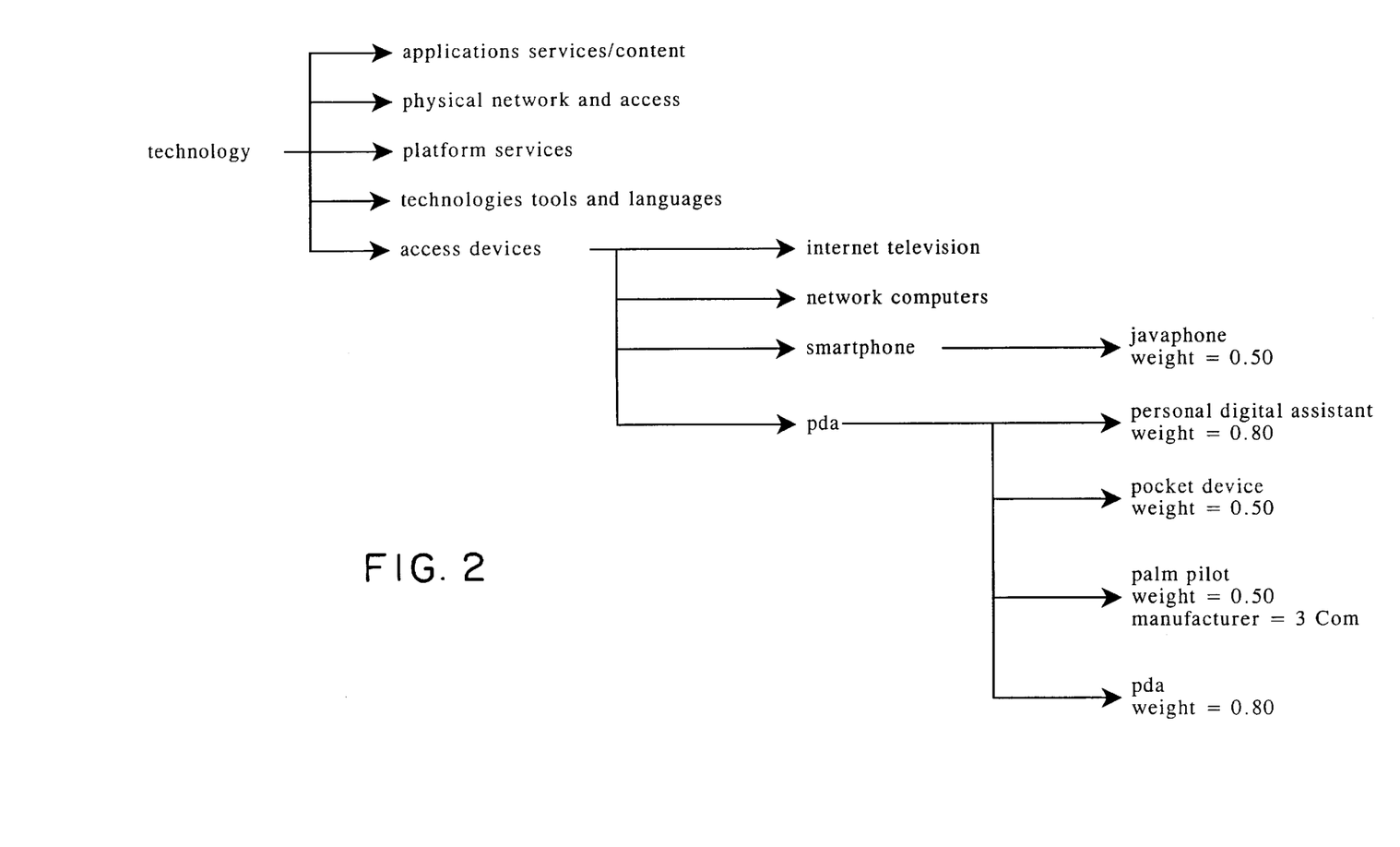
FIG. 2 illustrates the hierarchical structure of both an exemplary evidence set and an exemplary knowledge base from which the exemplary evidence set is derived.

FIG. 2 illustrates an exemplary hierarchical structure of both an evidence set 120 relating to technologies and a knowledge base 130 from which the evidence set 120 is derived. Evidence set 120 may include the top-level topics such as "access devices," "application services/content," "physical network and access,""platform services," and "technologies tools and languages." The top-level topic "access devices" may include subtopics "pda," "internet television." "network computers," and "smartphone." The evidence for "PDA" could include the terms "personal digital assistant," "handheld computer," and "palm pilot." The evidence for "smart phone" could include the single term "javaphone." For the purposes of this discussion, evidences include top-level topics, subtopics, and evidences. For "palm pilot," a manufacturer role is shown to be filled with "3 Com." This indicates that 3 Com is the manufacturer of the Palm Pilot.

Figure 3:
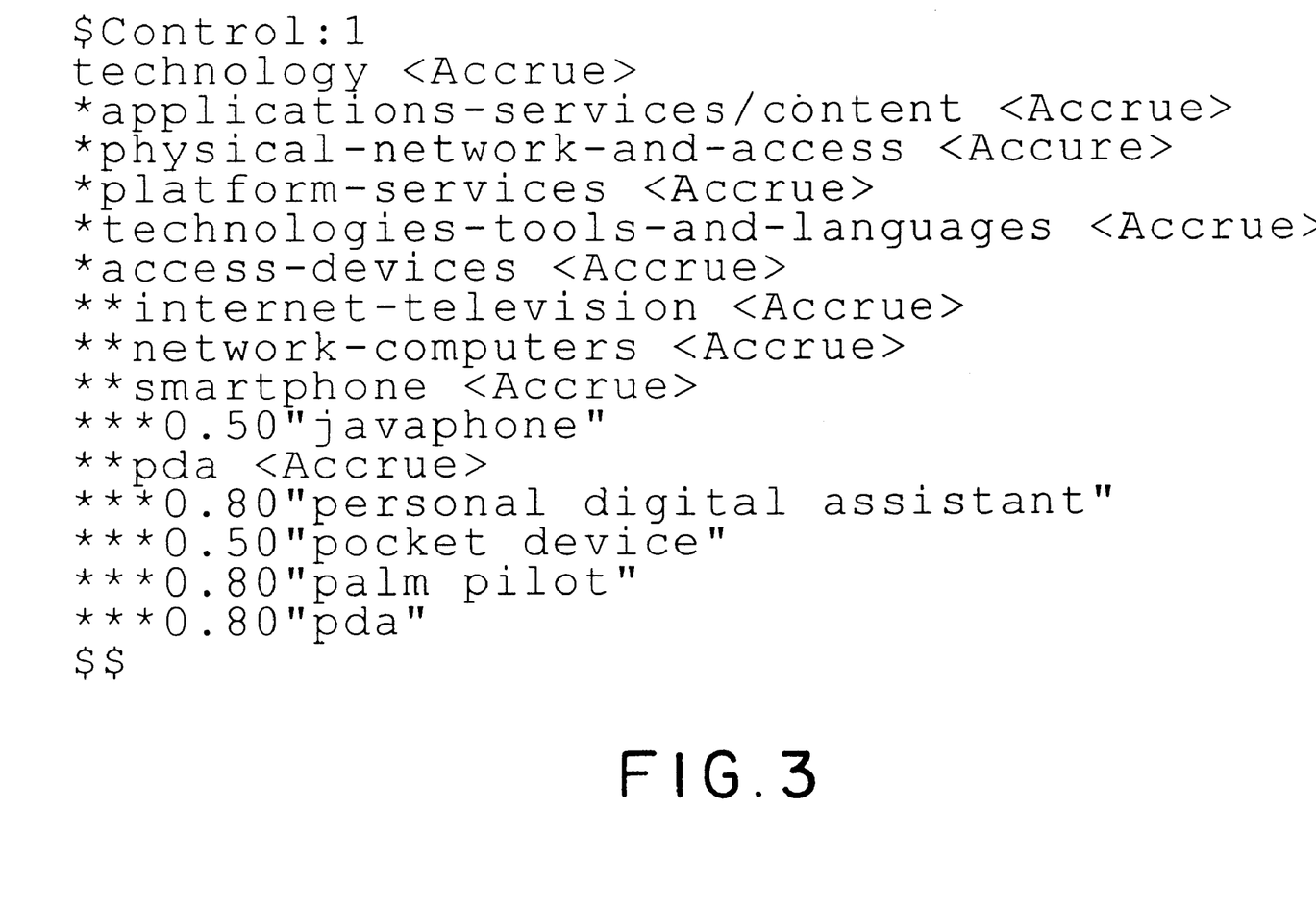
FIG. 3 provides the syntactical file format for the exemplary evidence set illustrated in FIG. 2.

FIG. 3 illustrates one possible format for the evidence set structure shown in FIG. 2. It will be understood by those skilled in the art that several other formats—whether or not presently existing—may be used to create the evidence set 120. Typically, the format comports with the syntax established by the developer of the search engine. One such format is described in VERITY, INC., *Introduction to Topics Guide V*2.0 (copyrighted Sep. 23, 1996; visited Mar. 21, 1998) <http://www.verity.com/support/s97dk/topic20/topcover.htm>.

Using conventions employed by Verity, a topic outline file is functionally similar to an evidence set 120. A topic outline file is an ASCII text file, which is structured in a format that contains topic definitions. The term "<Accrue>" represents an operator that selects documents that include at least one of the search elements specified. An asterisk symbol indicates the hierarchical level of the topic. For instance, "palm pilot" is a subtopic of "pda," which is a subtopic of "access-device," which is a subtopic of "technologies." The term "0.80" before "palm pilot" is a weight assignment, which effects the degree of relevance a term is given in the computation of a score, or importance rating, of a document. The score is calculated by taking into account the weight of each term. By convention, a document with a high score suggests greater relevancy. It will be understood to those skilled in the art and familiar with Verity's topicEditor that evidence set 120 may be constructed with other operators and/or modifiers, which are described in the above-listed Verity reference. These weights are also stored in the knowledge base 130, as indicated in FIG. 2.

Knowledge base 130 is a collection of interrelated information, facts, and/or statements. The knowledge base 130 contains strictly more information that is contained in the evidence set 120. Knowledge base 130 can be based on several types of relationships, including description logic and rule-based relationships. A relationship is a directed connection between two or more items or attributes. Each class includes an object. Typically, knowledge base 130 is stored as a record in a structured format. Knowledge base 130 includes a first class. A class may include the root class of the knowledge base, or the class describing all information in the knowledge base. It should be noted that the knowledge base 130 does not have to be rooted in a single class. If the structure of FIG. 2 were expressed as a knowledge base 130, for instance, the root class would be "technologies." A class is defined to include both traditional classes and metaclasses. Typically, classes are expressed in a core language and metaclasses are expressed in a metalanguage, which is generally more expressive than the core language. Metaclasses are classes that describe another class. Examples of information that is appropriate for metaclasses include subjective comments, details of how to present information, authorship, visibility, non-subject based information, and annotations. Authorship is information that defines, describes, and/or relates to the author of a record. Authorship can be a role. Visibility is information that determines whether information will be visible or invisible to users using the evidence set and/or search interface. Visibility can be either a role or a class. If information is invisible it will not be included in the evidence set 120 but it will be maintained in the knowledge base 130. This has the advantage of simplifying an evidence set 120 that contains a complex structure or a large number of terms. In addition, it may be undesirable for privacy or security reasons to display the entire evidence set 120 to every user. Those skilled in the art will understand that certain information may be expressed as either a class or a metaclass.

A knowledge base 130 may also contain necessary and/or sufficient conditions. A condition is necessary when it is required to be a member to a class, but does not satisfy a class by itself. For example, a mammal is a person, but just because something is a mammal does not necessary mean it is a person. A condition is sufficient if its satisfied where an individual must be an instance of a class. For example, if we know that an individual is a person, then we can infer from a sufficient condition that the person is a mammal.

It should be noted that Verity's topicEditor uses the term "knowledge base," as a grouping of topics or concepts. For the purposes of this discussion, knowledge base 130 is not limited to those knowledge bases that contain topics and evidence. Rather, knowledge base 130 as defined herein includes, but is not limited to, as grouping of other information such as role information and metainformation. One example of a role is a visibility role, which determines if an object should be included as a term in an evidence set. For example, a knowledge base 130 may include internal product designations, such as model or version number. In certain instances, it may be desirable to maintain this information in the knowledge base 130, but not include the information in the evidence set 120. For instance, one may limit the derivation of an evidence set to include those topics and evidences that satisfy a internal product designations role. It may be determined, however, that these internal product designations should not be included in the evidence set 120 itself. For instance, the internal product designations would not exist in documents outside of the company, and their use in searches of documents outside the company would not add to the search. Thus, the internal product codes would be invisible to the evidence set 120. In another aspect, the visibility may be used to limit the access of the internal product codes to a certain set of users. For instance, a visibility role may be used to define internal product designations visible for those using an evidence set 120 inside the company and invisible to those using an evidence set 120 outside the company.

In addition, the knowledge base 130 of the present invention is more expressive than the knowledge base of Verity's topicEditor. The knowledge base 130 of FIG. 2 may include, for example, the manufacturer of a product. A knowledge base 130 can include any description logic expression and/or frame-oriented expression. For instance, the manufacturer role of "palm pilot" is filled by "3 Com," the manufacturer of the Palm Pilot. The manufacturer, "3 Com," might be included as evidence when it can be determined from the knowledge base that "3 Com" only manufacturers one product. On the other hand, if it is determined from the knowledge base 130 that "3 Corn" fills the manufacturer role for several products, then when deriving the evidence set 120 it may be decided that "3 Corn" should not be added as evidence to "pda." This is because adding "3 Corn" as evidence to "pda" would produce over-inclusive search results. Thus, the knowledge base 130 of the instant invention is more expressive than the knowledge base of Verity's topicEditor.

In cases where the knowledge base 130 is based on description logic relationships, a description logic relationship exists between two classes and/or between a class and an object. The field of description logics, also sometimes referred to terminological logics, structured inheritance networks, and KL-ONE like systems by those skilled in the art. Description logics is the formal syntax and semantics for expressing and reasoning with descriptions.

Description logic relationships express knowledge about concepts in concept hierarchies. Typically description logic relationships are implemented with description logic languages. They are usually given a Tarski-style declarative semantics, which allows them to be seen as sub-languages of predicate logic. Starting with primitive concepts and roles, language constructs (such as intersection, union, role qualification, etc.) are employed to define new concepts and roles. Concepts can be considered as unary predicates which are interpreted as sets of individuals whereas roles are binary predicates which are interpreted as binary relations between individuals. Roles in some description logics may be higher order, i.e., they may relate three or more individuals to each other. The main reasoning tasks are classification and subsumption checking. Subsumption represents the "is-a" relation. A whole family of knowledge representation systems has been built using these languages and for most of them complexity results for the subsumption algorithm are known. Description logic systems have been used for building a variety of applications including software management systems, planning systems, configuration systems, and natural language understanding. Description logic systems are discussed in the following references: Ramesh S. Patil et al., *The DARPA Knowledge Sharing Effort: Progress Report*, KR'92 PRINCIPLES OF KNOWLEDGE REPRESENTATION AND REASONING, PROCEEDINGS OF THE THIRD INTERNATIONAL CONFERENCE (Oct. 25, 1992) and Peter F. Patel-Schneider and Bill Swartout, *Description-Logic Knowledge Representation System Specification from the KRSS Group of the ARPA Knowledge Sharing Effort* (Nov. 1, 1993). Description logics are also discussed in the following reference, which is incorporated herein by reference: U.S. Pat. No. 5,720,008 issued to McGuinness et al.

An example of a description logic language is CLASSIC, developed by AT&T Bell Laboratories. See Ronald J. Brachman et al., *Living with CLASSIC: When and How to Use a KL-ONE-Like Language*, Principles of Semantic Networks (1990). CLASSIC stands for "CLASSification of Individuals and Concepts." It has complete implementation in COMMON LISP. CLASSIC is a description logic-based knowledge representation system that follows a paradigm originally set out by the KL-ONE system; it concentrates on the definition of structured concepts, their organization into taxonomies, the creation and manipulation of individual instances of such concepts, and the key inferences of subsumption and classification.

The formulation of knowledge base 130 based on description logic relationships will be well understood by those skilled in the art. Equally understood by those skilled in the art is the implementation of specific description logic languages, such as CLASSIC. Nevertheless, a general description of the advantages of a knowledge base based on description logic relationships is appropriate. Description logic relationships provide a convenient representation for reasoning with hierarchies. In addition, description logics support certain classes of inference and contradiction detection for modification of existing knowledge bases. Description logics are especially powerful when relationships exist between objects, such as companies that make products in particular topic areas, and when those relationships may be interesting to query or to restrict. Thus, in a system built with a deeper knowledge component, one can choose only to use single product companies as evidence for a topic but then later retrieve all the companies that make products in a particular category and find the multiple product companies as well. This allows knowledge to be maintained in a single viewable modifiable storage place. Knowledge can be pruned appropriately to make evidence sets for specific purposes.

The knowledge base 130 may be based on several types of relationships including description logic and rule-based relationships. In such instances a rule-based relationship exists between two class expressions. A class expression is a definition of a class, which may or may not be named.

In the case of description logic relationships, the knowledge base 130 may be generated with a known description logic language, such as CLASSIC. Of course, it will be understood by those skilled in the art that the generation of a knowledge base 130 based on description logic relationship is in no way limited to implementation in CLASSIC. Nevertheless, the advantages of a knowledge base 130 based on description logic relationships may become clearer with a brief description of CLASSIC.

CLASSIC provides for concepts, roles, individuals, and rules. Concepts are descriptions with potentially complex structure, formed by composing a limited set of description-forming operators. Concepts correspond to one-place predicates, and thus, can be applied only to one individual at a time. Roles are simple formal terms for properties. Roles correspond to two-place predicates, and are used to relate two individuals at a time. Roles that must be filled by exactly one individual are called attributes. For the purpose of this discussion, a class is a description of an object, and it may include concepts, roles, and attributes.

Individuals are formal constructs that directly represent objects in the domain of interest. Individuals are often given properties by asserting that they satisfy concepts and that their roles are filled by other individuals. For the purpose of this discussion, an object includes individuals.

Rules associate one class description with another class description.

Concepts and individuals are placed into a taxonomy, or hierarchy. A more general concept will be above a more specific concept in the taxonomy. For example, if there were a concept for "a PDA developed by Company A and Company B," then this would be a more specific concept than "a PDA developed by at least one company," because the first concept describes PDAs developed by at least two companies. In the taxonomy, individuals are underneath all the concepts that they satisfy. For example, the individual "JavaPhone," which is a type of access device, would be under the concept "ACCESS-DEVICES" in the taxonomy. To maintain this taxonomy, CLASSIC also determines the derivable properties of all individuals and concepts— inheriting properties from more-general descriptions as well as combining properties as appropriate.

CLASSIC also provides for a number of deductive inferences including completion, classification and subsumption, and rule application. With completion, logical consequences of assertions about individuals and descriptions of concepts are computed.

In CLASSIC, completion inferences include, among others, inheritance, combination, propagation, contradiction detection, and incoherent concept detection. With inheritance, restrictions that apply to instances of a concept must also apply to instances of specializations of that concept. In a sense, properties are "inherited" by more specific concepts from those that they specialize. With combination, restrictions on concepts and descriptions may be logically combined to make narrower restrictions. With propagation, when an assertion is made about an individual, it may hold logical consequences for some other related individual. For example, if it is known that everything that fills a manufacturer role on a particular individual "palm pilot" is a company and it is later asserted that "3 Com" fills the manufacturer role on the individual "palm pilot," then "3 Com" is derived to be a company. The logical consequence "propagates" forward when this assertion is made. With contradiction detection, it is possible to detect when two or more facts about an individual are logically impossible to conjoin together. With incoherent concept detection, an assignment of a restriction to a concept that produces a logical impossibility is detected.

Classification and subsumption inferences include concept classification, individual classification, and subsumption. With concept classification, all concepts provably more general than a concept and all concepts provably more specific than a concept are found. With individual classification, all concepts that an individual provably satisfies are determined. With subsumption, questions about whether or not one concept is more general than another concept are resolved.

Rule application inferences apply simple forward-chaining rules, which have concept descriptions as antecedents and consequents. When an individual is determined to satisfy the antecedent of a rule, is asserted to satisfy the consequent as well. CLASSIC also includes operators, which are used to form conjunctions, role restrictions, test restrictions, enumerated concepts, and primitive and disjoint primitive concepts.

In the case of a rule based knowledge base, a rule based relationship exists between the first class and the second class. One concept may be related to another concept by a rule. For example, all people—in the United States—may be known to be instances of things with a Social Security number. It is possible for evidence sets for people may also use the social security number of the person if it is known. Thus, a given rule connecting person to at least one social security number; the evidence set could use social security number if the social security role was filled.

Referring again to FIG. 1, client 150 is coupled to the network 140. Client 150 is a computer that requests services of the server 110; client 150 may also be another server. Documents 160 are also coupled to the network 140. Documents 160 are records that have permanence and that can be read by man or machine, including files, directories, indexes, strings, tables, cells, codes, Web Pages, and any other information objects. Those skilled in the art understand that the embodiment of FIG. 1 can be modified to couple client 150, documents 160, or both directly to the server 110, rather than via the network 140. Moreover, documents 160 may alternatively be stored on the server 110, the client 150, or both. Those skilled in the art will understand that a search engine typically searches indexes of documents. Rather than searching the contents of the documents for each search, a search engine index documents to determine the words, texts, strings, values, and other variables that occur within a document. The index will often contain information relating to the location of the variable within the document and its relation to other variables. For the purposes of this discussion, documents will include both the documents themselves and indexes of documents.

Figure 4:
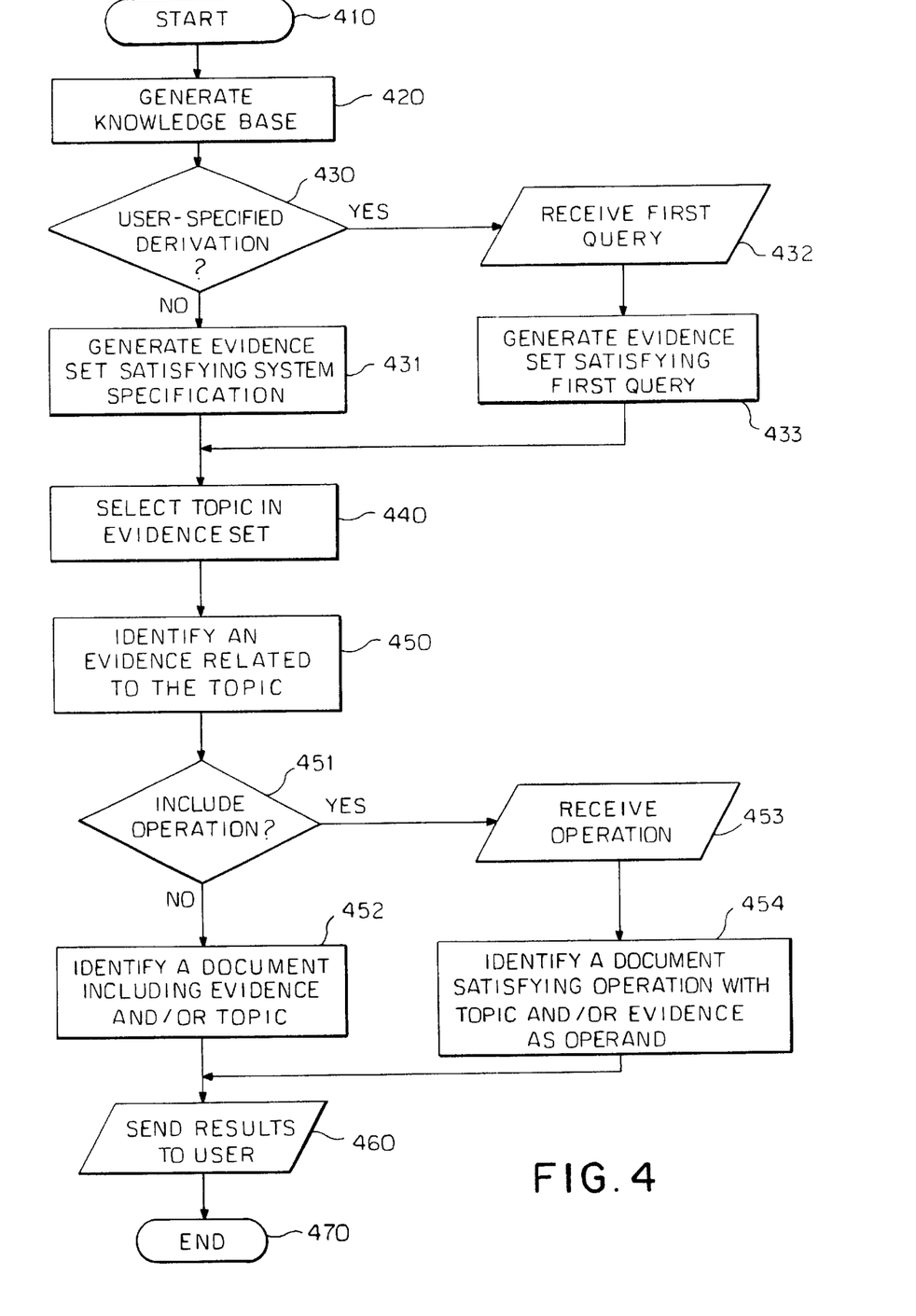
FIG. 4 provides a flowchart describing a process in accordance with a method of the present invention.

In accordance with a process shown in the flowchart of FIG. 4, knowledge base 130 is generated, and evidence set 120 is derived from the knowledge base 130. A search query is submitted by a user accessing the client 150. The server 110 receives the search query, and the search is performed using the evidence set 120. For the purposes of this discussion, it will be understood that the process can also be performed entirely on a stand-alone computer, such as a single client or single server. For example, the process may be implemented to search the contents of files stored on a computer.

Before discussing the specific steps, it may be useful to discuss the ways in which the present invention may be implemented generally. For instance, the knowledge base 130 is typically generated by an individual with expertise in creating the structures required for a typical knowledge base 130. In one aspect of the invention, the evidence set 120 is derived from the knowledge base 130. A user accessing the client 150 then submits a search query to the server 110 via the network 140. The server 110 executes search instructions 113 to run a search engine. The search engine then accesses the evidence set 120. For each word or phrase in the search query, the search engine determines if there is a corresponding topic. If a topic corresponds to a word or phrase in the search query, then the search engine will automatically expand the query to include evidence that is related to the topic. Those skilled in the art will understand that the present invention may be implemented in other methods. For instance, after creation of the knowledge base 130, a user may specify the derivation of the evidence set 120. The user-specified evidence set 120 may be submitted in its entirety as a query, or the user-specified search engine may implement the search engine as discussed above. The present invention will be better understood by a detailed discussion of the process.

The process of FIG. 4 starts at step 410. Generally, it will be understood by those skilled in the art that the process is not restricted to the order of the steps as shown in FIG. 4, and may be modified to change the order of the steps in certain instances. In addition, those skilled in the art will understand that not all steps of the process of FIG. 4 are required to practice the invention. The server 110 executing the search instructions 113 generates the knowledge base 130, step 420. One method for generating the knowledge base 130 includes receiving input from a user to generate the knowledge base.

The evidence set 120 is derived from the knowledge base in steps 430 to 433. As with the entire process of FIG. 4 generally, those skilled in the art understand that it is not necessary to perform each of steps 430 to 433 derive the evidence set 120. Moreover, steps 430 to 433 illustrate only one method of deriving the evidence set 120 from the knowledge base 130. In step 430, a determination is made whether the user will specify the derivation of the evidence set.

If the user will not specify the derivation of the evidence set, an evidence set 120 is generated that satisfies a system specification, step 431. A system specification is information that permits the evidence set 120 to be generated without any input or selection by the user. For instance, a system specification may consist of the visibility role. Those evidences and topics that are determined not to be invisible by the knowledge base 130 will be included in the evidence set 120 during the generation in step 431. In contrast, those topics and evidences not visible will not be included in the generation of the evidence set 120 in step 431. In this way, the system specification—in this case the visibility role— determines what information from the knowledge base 130 will be included in the evidence set 120.

A user-selected evidence set requires input and/or selection by the user accessing the client 150. For instance, in FIG. 2 the user may select an evidence set to include topics and evidence below "access devices" in the taxonomy. A variety of methods exist for the user to specify an evidence set 120. For example, in step 432 a first query is received to select portion of the information in the knowledge base 130 from which the evidence set 120 will be derived. The first query defines the partial evidence set and may include a term description and an operator. A term description may include, but is not limited to, concepts, roles, attributes, or objects. An operator is a symbol that represents an action to be performed in an operation. An operation is an action specified by one or more operands. An operand is a variable, constant, or function upon which an operation is to be performed. Examples of operator categories include the following: boolean, grammatical, proximity, relational, concept, or any other operator defined by a description logic language such as CLASSIC. Examples of operators include AND, OR, NOT, and ALL. Examples of grammatical operators include PHRASE, SENTENCE, or PARAGRAPH. For instance, the query "A PARAGRAPH B" will locate all records where A and B are within the same paragraph. The first query of step 432 is received by the translator, and the partial evidence set is generated, step 433. It will be understood by those skilled in the art that typically the evidence set 120 will be generated periodically, but not necessarily for every search that is performed by a search engine. This is because an evidence set 120 may include a large amount of information, which may require excessive processing for derivation. Similarly, the generation of a partial evidence set does not necessarily entail the actual creation of a new file in which the partial evidence will be stored. Rather, the partial evidence set may be generated by assigning a pointer or pointers to indicate what portions of the partial evidence set will be used and/or sent to the user. This minimizes the amount of storage space for the evidence set 120 and also reduces the time that would be required to write a file or record for each partial evidence set.

The user-selected evidence set is generated in step 433. This first query conceptually prunes the knowledge base to produce an evidence set. For instance, if the knowledge base 130 relates to the subject matter of technologies, as represented in FIG. 2, it may be desirable to derive a partial evidence set limited to "access devices." This may be desirable in situations where the user mainly constructs search queries that relate to subject matter of access devices. Those skilled in the art will understand that both user and system selection of an evidence set 120 may be used in combination. For instance, a system-selected evidence set may be modified by user selection.

Moreover, an evidence set 120—either system-selected or user-selected—may be derived for a specific query, and the entire evidence set 120 may be submitted as a search query to the search engine. For example, a user interested in PDAs may forego manual construction of a search query. Instead, the user may derive a partial evidence set to include the only the terms of the evidence set relating to "pda" and below in the taxonomy of FIG. 2. In this instance, the partial evidence set would be "pda," "personal digital assistant," "pocket device," and "palm pilot." Deriving partial evidence sets may be particularly useful when a user repeatedly, periodically searches for similar subject matter. In this way, deriving a partial evidence set permits the user to create customized search queries defined by relationships within the knowledge base 130. It should be noted for the purposes of this discussion that an evidence set 120 includes both partial evidence sets and complete evidence sets.

In both steps 431 and 433 the evidence set 120 is generated. Evidence set 120 may be generated using a variety of methods, however, one method is to employ a translator. A translator takes the information in a knowledge base 130 and converts it into the syntax of an evidence set 120. A reverse translator is capable of generating a knowledge base 130 based on an evidence set 120. A translator must maintain additional information in order to regenerate the complete knowledge base 130 from an evidence set 120. For instance, if a user-selected evidence set represents only those topics and evidences below "access devices" in the taxonomy of FIG. 2, it would be impossible to reconstruct a complete knowledge base 130 with a reverse translator based solely on the information of the pruned evidence set 120.

In step 440, a topic is selected from the evidence set 120. The topic may be selected by a variety of methods. For instance, the evidence set 120 may be presented on the client 150 to the user. Presenting includes the representation of data or information in a graphical, visual, aural, audio, tactile, or other sensory medium or mode. The user then may select one or more topic of the evidence set 120. In one method of presenting the evidence set 120, the user is shown a graphical user interface (GUI), which is similar to the evidence set structure of FIG. 2. The levels of the taxonomy can be expanded or collapsed similar to the Microsoft File Manager (copyrighted 1991–1996). A user may select the topic "pda" by clicking or highlighting the term on the screen.

Other methods for selecting a topic are possible. For instance, presentation of the evidence set 120 is not required for selection of a topic. In one example, the topic may be selected by submitting a search query having the topic as one of its terms. This method of selecting a topic of the evidence set 120 is a form of automated query expansion. It will be understood by those skilled in the art that a topic is not selected when the search query does not contain a term in the evidence set 120. In such instances, the evidence set 120 will not be employed. Examples of when the evidence set 120 will not be employed include when the terms in the search query are unrelated to the subject matter of the evidence set or when the terms in a search query are relatively unique, thus eliminating related terms in the evidence set 120.

Another method for selecting the topic is automatic selection by the server 110.

In step 450, an evidence, or in certain cases at least one evidence, is identified that is related to the topic selected in step 440. The evidence is related to the topic. For instance, if the topic is "pda" the evidence may be "personal digital assistant." The first term, "pda," is related to the second term, "personal digital assistant" in a hierarchical relationship within the evidence set. In the case of Verity syntax, the relationship between is identified between the first term and the second term is based on the syntactical structure of the evidence set 120. Those skilled in the art will understand that a plurality of evidences may be related to the topic, however, the instant invention may be practiced by identifying a single evidence.

A decision is made whether to include an operation in the search query, step 451. If no operation is included, documents are identified that include the topic, the evidence, or both. This is a form of query expansion. For example, using the example of the previous paragraph, documents containing either "pda" or "personal digital assistant" will be identified by the server 110.

If an operation is included, then the operation is received from the client accessing the user, step 453. Documents are identified satisfying the operation with the topic and/or the evidence as an operand, step 454. Again, this is a form of query expansion. In many instances, the query expansion is in the form of substituting the term "pda" in the search query with the combined terms of "pda or personal digital assistant".

In step 460, the results are sent from the server 110 to the client 150 via the network 140. In step 470, the process ends.

Those skilled in the art will understand that the present invention is not limited to the inclusion of the topic name as evidence for itself. For instance in FIG. 2, "pda" is listed as evidence to the topic "pda." Thus, in some instances we may list the topic as evidence under the topic. On the other hand under "smartphone," we do not list "smartphone" as evidence under the topic "smartphone." The purposeful exclusion of a topic name as evidence to itself is especially useful when the topic name has multiple senses or the inclusion of the topic name as evidence would produce over-inclusive results. For instance, the topic "access devices" may produce over-inclusive results if added as evidence to the topic "pda."

In another embodiment, an extension to the evidence set 120 is created. The extension augments the evidence set 120, which is often commonly shared by multiple users. The extension to the evidence set may be stored on the client 150, the server 110, or anywhere else on the network 140. For example, each user may maintain their own personal extension. This extension would contain modifications to the evidence set 120, which would be desired by an individual user, but not necessarily all users.

Those skilled in the art will understand that the present invention has advantages to the derivation of evidence sets using text editors and/or GUIs; however, those skilled in the art will also understand that the present invention may be employed with a GUI and/or text editor. For instance, a knowledge base 130 may be created using a text editor by inputting CLASSIC commands. Moreover, a knowledge base 130 may also be created using a GUI environment to establish relationships between entities. Thus, notwithstanding the discussion of evidence sets in the background, the present invention does not exclude the use of a text editor or GUI.

The present invention therefore provides for derivation of an evidence set 120 from a knowledge base 130.

What is claimed is:

1. A method for searching on a computer, comprising the steps of:

generating a knowledge base including information of a first entity and a second entity, and a description logic relationship existing between the first entity and the second entity;

specifying, prior to a document search being performed, an evidence set to include a proper subset of the information, the evidence set including a plurality of topics and subtopics, and a description logic relationship existing between topics and subtopics;

deriving, prior to a document search being performed, the evidence set from the knowledge base; and performing a document search using said evidence set.

2. The method of claim 1, wherein the knowledge base further includes a first class expression and a second class expression, a rule-based relationship existing between the first class expression and the second class expression.

3. The method of claim 1, wherein the knowledge base includes a role.

4. The method of claim 3, herein the role is authorship.

5. The method of claim 3, wherein the role is visibility.

6. The method of claim 1, wherein the knowledge base includes a class.

7. The method of claim 6, wherein the class is visibility.

8. The method of claim 6, wherein the class includes metainformation.

9. The method of claim 6, wherein the class is derived from description logic expressions.

10. The method of claim 1, wherein the knowledge base includes a rule.

11. The method of claim 1, wherein the knowledge base includes a necessary condition.

12. The method of claim 1, wherein the knowledge base includes a sufficient condition.

13. The method of claim 1, wherein said specifying step includes the step of receiving a first query from a user.

14. The method of claim 13, wherein said deriving step includes the step of generating the evidence set that satisfies the first query.

15. The method of claim 13, wherein the first query includes the term description.

16. The method of claim 13, wherein the first query includes a operation in which an operand is a term description.

17. The method of claim 1, wherein said specifying step includes the step of establishing system-specified parameters.

18. The method of claim 17, wherein said deriving step includes the step of generating the evidence set that satisfies the system-specified parameters.

19. The method of claim 1, wherein the knowledge base includes a class and an object, the evidence set includes a topic and a term, said deriving step includes the step of:

identifying a first relationship between the class and the topic and a second relationship between the object and the term;

ordering the topic and the term in a hierarchical structure in the evidence set.

20. The method of claim 1, further comprising the steps of:

performing a search using the evidence set.

21. The method of 20, wherein said performing step includes the steps of:

receiving a second query that includes a topic of the evidence set;

identifying an evidence related to the topic; and locating a document that includes the evidence.

22. The method of claim 21, wherein the topic is selected by a user.

23. The method of claim 22, wherein selecting the first term of the evidence set by the user includes the steps of:
   presenting a portion of the evidence set to the user; and
   receiving the topic from the user.

24. The method of claim 20, wherein said performing step includes the steps of:
   receiving a second query that includes an operation in which the topic is an operand; and
   identifying a document that satisfies the operation.

25. The method of 21, wherein a hierarchical relationship exists between the evidence and the topic in the evidence set.

26. The method of claim 1, further comprising the step of:
   creating an extension of the evidence set, the extension having an evidence; and
   identifying a document that includes the evidence.

27. An apparatus for searching on a computer network, comprising:
   a processor;
   a memory that stores instructions adapted to be executed by said processor to perform the steps of:
      generating a knowledge base including information of a first entity and a second entity, a description logic relationship existing between the first entity and the second entity;
      specifying, prior to a document search being performed, an evidence set to include a proper subset of the information, the evidence set including a plurality of topics and subtopics, and a description logic relationship existing between topics and subtopics;
      deriving, prior to a document search being performed, the evidence set from the knowledge base;
   performing a document search using said evidence set; and
   a port adapted to be coupled to the network, said port and said memory coupled to said processor.

28. An apparatus for searching on a computer network, comprising:
   means for generating a knowledge base that includes information of a first entity and a second entity, and a description logic relationship existing between the first entity and second entity without prejudice; and
   means for deriving, prior to a document search being performed, an evidence set from the knowledge base, the evidence set including a plurality of topics and subtopics, and a description logic relationship existing between topics and subtopics, and; means for performing a document search using said evidence set.

29. A medium having stored thereon a plurality of executable instructions, the plurality of instructions comprising instructions to:
   generate a knowledge base including information of a first entity and a second entity, a description logic relationship existing between the first entity and the second entity;
   specify, prior to a document search being performed, an evidence set to include a proper subset of the information;
   derive, prior to a document search being performed, the evidence set from the knowledge base, the evidence set including a plurality of topics and subtopics, and a description logic relationship existing between topics and subtopics; and
   perform a document search using said evidence set.

* * * * *